United States Patent [19]

Stein

[11] 3,757,535

[45] Sept. 11, 1973

[54] DRIVE ASSEMBLY WITH COMPENSATION FOR MISALIGNMENT

[75] Inventor: Wolfgang J. Stein, Milford, Conn.

[73] Assignee: Avco Corporation, Stratford, Conn.

[22] Filed: Nov. 3, 1971

[21] Appl. No.: 195,206

[52] U.S. Cl. .................................. 64/9 R, 184/6.11
[51] Int. Cl. ............................................... F16d 3/46
[58] Field of Search .......................... 64/6, 9 R, 16; 184/1 R, 6.11; 287/53 SS

[56] References Cited
UNITED STATES PATENTS

| 2,943,463 | 7/1960 | Shipley | 64/9 R |
| 2,279,955 | 4/1942 | Sipe | 287/53 SS |
| 3,132,494 | 5/1964 | Hoffer | 64/9 R |
| 2,982,117 | 5/1961 | Erpenstein | 64/9 R |
| 2,885,232 | 5/1959 | Eberly | 64/9 R X |
| 3,375,901 | 4/1968 | Farrell | 184/1 R |

Primary Examiner—Manuel A. Antonakas
Attorney—Charles M. Hogan et al.

[57] ABSTRACT

A drive shaft has a bore formed at its outer facing end. An annular adapter element has a series of external splines which interfit with internal splines in the bore of the drive shaft. The adapter element has a bore with internal splines that interfit with external splines on a driven shaft received in the adapter bore. The internal splines between the drive shaft and the external splines on the adapter element are lubricated so that the adapter element rocks preferentially relative to the drive shaft to compensate for angular misalignment. The adapter element is retained relative to the drive shaft and a seal is provided between them so that the driven shaft may be removed without exposing the lubrication system for the spline. In another form an elongated tubular element is placed between the adapter and the drive shaft to compensate for both parallel and angular misalignment.

13 Claims, 2 Drawing Figures

Patented Sept. 11, 1973 3,757,535

INVENTOR.
WOLFGANG J. STEIN
BY Charles M. Hogan
Gary M. Brown
ATTORNEYS.

DRIVE ASSEMBLY WITH COMPENSATION FOR MISALIGNMENT

The present invention relates to drive assemblies and more specifically to drive assemblies that compensate for misalignment.

There have been many drive assemblies proposed in the past that compensate for misalignment between drive and driven shafts. For the most part they are bulky and complicated devices that greatly add to the complexity, cost and weight of the drive assembly. This is a great disadvantage when the drive assembly is incorporated in a gas turbine aircraft-type engine. An additional disadvantage of the prior art drive arrangements is that in some cases the interior of a gear box with which the drive is used is exposed when the driven shaft is removed. The exposure of the interior of the gear box greatly increases the possibility of contaminants.

Therefore it is an object of the present invention to provide a highly simplified, effective and economical drive assembly that compensates for misalignment.

This end is achieved by an annular adapter element having external splines which interfit with internal splines in a bore of a drive shaft means. The adapter element has internal directed splines on its own bore which interfit with external splines on a driven shaft received in the adapter bore. The coefficient of friction between the internal splines on the drive shaft means and the external splines on the adapter is maintained at a level lower than the coefficient of friction between the adapter element and the driven shaft so that the adapter rocks preferentially relative to the drive shaft to compensate for misalignment.

The above and other related objects and features of the present invention will be apparent from a reading of the description of the disclosure shown in the accompanying drawing and the novelty thereof pointed out in the appended claims.

Figure 1:
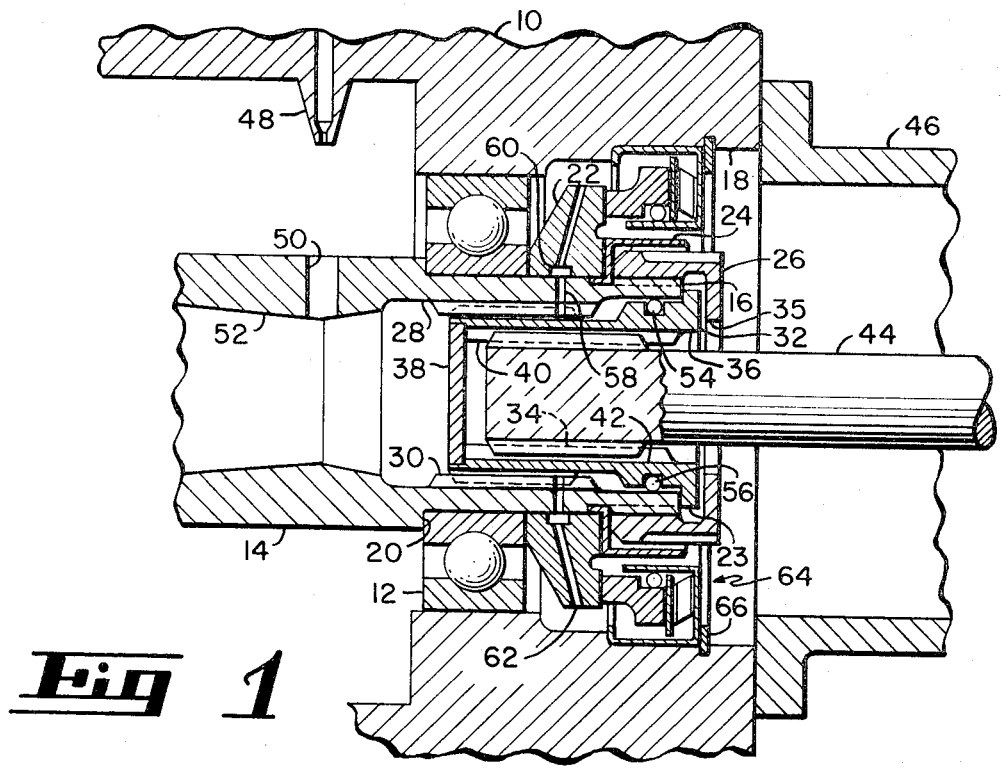
FIG. 1 is a drive assembly embodying the present invention and adapted to compensate for angular misalignment.

Referring to FIG. 1 there is shown a drive assembly incorporated in an outer housing 10. A bearing assembly 12 secured in housing 10 journals a drive shaft 14. A shoulder 20 on shaft 14 abuts one side of the inner race of bearing assembly 12. A combination seal and spacer assembly 22 abuts the opposite side of the inner race. An annular retaining ring 24 abuts seal element 22 and nut 26 sandwiches these elements together and retains them on shaft 14.

To simplify the discussion of the present invention the means for driving the shaft, in addition to the means for journaling the shaft 14 in addition to the bearing assembly, will not be shown. It should be apparent to those skilled in the art that many different arrangements can be utilized for this purpose.

An outer facing end 16 of shaft 14 faces the exterior of the housing 10 through a generally annular opening 18 formed generally in line with the outer facing end of shaft 14. Shaft 14 has a bore 28 formed in its outer facing end and a series of internal splines 30 are formed in this bore. An annular adapter element 32 is received in bore 28. Adapter element 32 has external splines 34 formed around its periphery and these splines interfit with the splines 30 on the interior wall of bore 28. Adapter element 32 has an internal bore 36 opened to the exterior of housing 10.

As herein shown, adapter element 32 is in a tubular form and has a disk 38 on the interior end of the tubular element to seal off the interior of the gear box from the exterior. However, it should be apparent that the adapter element may be formed by a casting or other suitable arrangement. A series of inwardly directed splines 40 are formed on the interior of bore 36. These splines receive interfitting splines 42 of a driven shaft 44.

For this particular arrangement driven shaft 44 extends to an accessory, positioned in housing 46. Driven shaft 44 is a generally long shaft splined at both ends so that the only misalignment presented by driven shaft 44 relative to drive shaft 14 is an angular misalignment.

The splines 30 and 34 are lubricated by means of lubricating fluid which is discharged from nozzle 48 by means of a suitable pressurizing system against the exterior of drive shaft 14. Suitable radial ports 50 (only one of which is shown) permit lubricating fluid to pass from the nozzle 48 to an interior passage 52 extending to bore 28. Lubricating fluid thus passes into the splines 30, 34 between the adapter element 32 and the bore 28 of the drive shaft 14. This fluid is prevented from passing outward between the adapter and the bore 28 by an O-ring 54 received in an annular groove 56. A scavenge flow of fluid through the splines is promoted by means of a series of radially extending ports 58 which extend from the innermost portion of the splines 30 or, in other words, the minor diameter of the internal spline in the interior of the shaft 14 to the exterior thereof. An annular recess 60 and additional radial ports 62 in the seal element 22 provide a passageway to the annular space outside of the shaft 14. From there the lubricating fluid can be returned to the pressurizing means by a suitable arrangement. A stationary seal element, generally indicated by reference character 64, retained in opening 18 by retaining ring 66 cooperates with seal element 22 to prevent leakage of lubricating fluid from the opening 18 by way of the exterior of shaft 14.

Element 32 is retained in place by an integral flange 23 which is received between the outer facing end 16 of shaft 14 and a flange 35 integral with nut 26.

As the drive and driven shafts rotate, lubricating fluid enters the interior of shaft 14 and passes to the splines 30 and 34 where it is scavenged through ports 58. Since ports 58 extend to the inner side of splines 30, substantially all of the annulus between the inner wall of bore 28 and the base of the splines 34 is immersed in lubricating fluid.

During rotation the tangential forces at the spline surfaces create a friction force. The tangential force at the inner pair of splines 40 and 42 is greater than the tangential force of splines 30 and 34 for a given transmitted torque. This causes a reduced friction force at the exterior splines 30 and 34. However, the coefficient of friction in between the splines 30 and 34 is maintained at a much lower level than that for the inner splines because of the lubricating fluid.

The substantial reduction in the coefficient of friction between the splines 30 and 34 provided by the lubricating fluid causes the adapter element 32 to rock preferentially relative to drive shaft 14 whenever there is an angular misalignment of driven shaft 44. Since the splines 40 and 42 have a much greater coefficient of friction they resist any movement of the adapter element 34 and therefore the adapter rocks relative to the drive shaft rather than the driven shaft 44.

The only splines that are subjected to wear in this arrangement are the splines 30 and 34. However, this wear is minimized due to the lubricating fluid. Furthermore, the reduced tangential force on the splines 30 and 34 enables their length to be shorter than the length of splines 40 and 42 for a given torque capacity. The shorter splines 30 and 34 can accommodate a greater angle of misalignment for a given drive assembly size.

Figure 2:
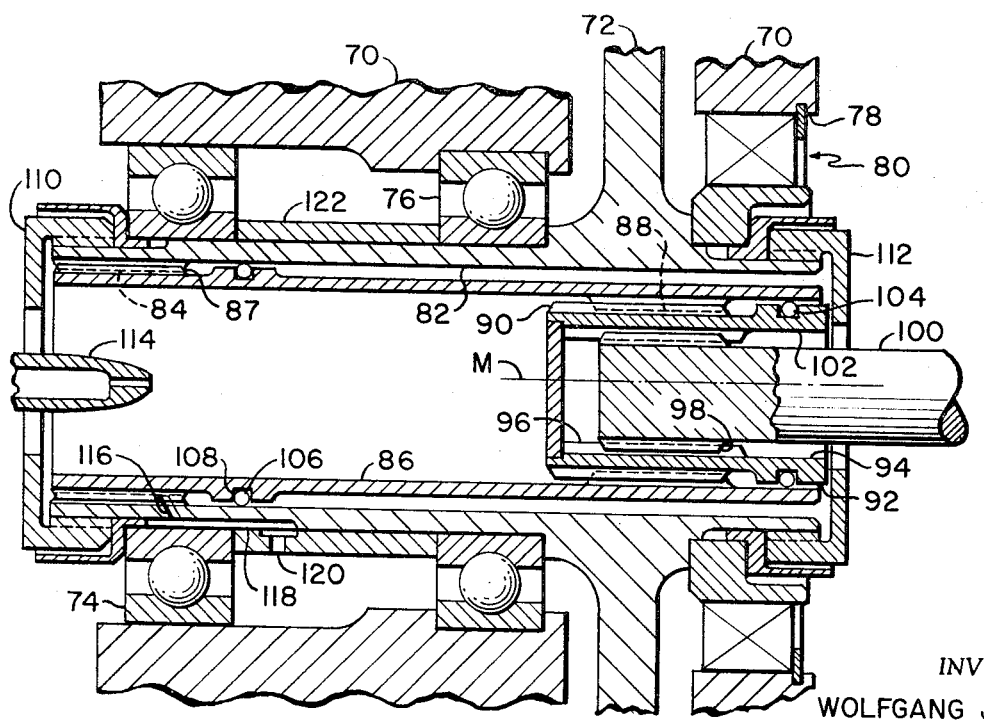
FIG. 2 is another drive assembly embodying the present invention and adapted to compensate for both angular and parallel misalignment.

The above arrangement is used in the case where angular misalignment only is compensated for. However, the arrangement shown in FIG. 2 compensates not only angular but parallel misalignment of shafts. This gear arrangement comprises a housing 70 on which an outer drive shaft 72 is journaled by space bearing assemblies 74 and 76. Outer drive shaft 72 has an integral gear assembly (not shown) which receives a drive input from a suitable gear, as will be apparent to those skilled in the art. An opening 78 is formed in housing 70 in line with the outer facing end of outer shaft 72. A suitable seal arrangement, generally indicated by reference character 80, seals the outer periphery of shaft 72 at opening 78 to prevent leakage of lubricating fluid.

Outer drive shaft 72 has a through bore 82 having inwardly directed splines 84 at the end of the shaft 72 away from opening 78. A generally tubular connecting element 86 is received within through bore 82 and has external splines 87 which interfit with splines 84 on drive shaft 72. A series of inner splines 88 adjacent opening 78 receive outer splines 90 on the periphery of an annular adapter element 92. Adapter element 92 has a bore 94 with internal splines 96. Internal splines 96 interfit with external splines 98 on a driven shaft 100 that is received within bore 94.

An O-ring 102 received in groove 104 seals the space between adapter element 92 and the tubular element 86. A second O-ring 106 received in groove 108 seals the space between tubular element 86 and the through bore 82 of outer shaft 72.

The axial movement of tubular shaft 86 is restrained by flanges 110 and 112 thread onto opposite ends of outer drive shaft 72. The flanged element 112 also restrains the movement of annular adapter element 92 out of the opening 78.

Lubricating fluid is supplied to the interior of tubular element 86 via a nozzle 114 by a suitable pressurizing device. A scavenge path for oil is provided from splines 84 and 87 by a series of radial ports 116 extending from the minor diameter of internal splines 84 to a recess 118 formed in the exterior of shaft 72. Recess 118 connects with radial ports 120 formed in a spacer sleeve 122 for discharge back to a suitable sump in the gear box.

In operation of this drive assembly lubricating fluid is directed into the interior of tubular element 86. It forms an annular layer between splines 88 and 90 and also between splines 84 and 87. The flow through splines 84 and 87 is promoted by radial scavenging ports through centrifugal action. In a fashion similar to that for the coupling in FIG. 1 the spline pairs 84, 87 and 88, 90 rock rather than spline pairs 96 and 98. This is due to the greatly reduced coefficient of friction maintained by the presence of the lubricating fluid. It should be noted that this arrangement is particularly advantageous when the shaft 100 is a rigid shaft and not capable of angular movement. If shaft 100 is displaced laterally to the axis denoted by M, the tubular element 86 rocks at the spline pairs 84, 87 and 88, 90 for each revolution of the assembly. This compensates for both angular and parallel misalignment of the drive shaft 72 and the driven shaft 100.

In both of the arrangements described above the misalignment normally found between a driven and a drive shaft are compensated for by an extremely compact and simplified arrangement. It should be noted that the driven shafts in both assemblies can be withdrawn from the adapter element without exposing the lubricating system for the coupling and for the interior of the gear box. This greatly minimizes the possibilities of contaminating the gear box during removal of a driven item, such as an accessory.

While the preferred embodiment of the present invention has been described, it should be apparent to those skilled in the art that other modifications may be preformed without departing from its spirit and scope.

Having thus described the invention what is claimed as novel and desired to be secured by Letters Patent of the United States is:

1. A drive assembly comprising:
   a drive shaft having a bore at an outer facing end thereof and internal splines formed in said bore;
   an annular adapter element received in said drive shaft bore and having external splines interfitting with the internal splines formed in said drive shaft bore;
   said adapter element also having a bore with internal splines formed therein to interfit with external splines of a driven shaft receivable in said adapter bore;
   means for maintaining the coefficient of friction between the drive shaft splines and the adapter element external splines substantially lower than the coefficient of friction between the adapter element internal splines and the splines of said driven shaft, said means comprising means for supplying lubricant to the interfitting internal splines of said drive shaft and the external splines of said adapter element whereby the adapter element rocks preferentially relative to the drive shaft to compensate for misalignment between the drive shaft means and said driven shaft.

2. A drive assembly as in claim 1 further comprising means for scavenging oil from said internal splines of said drive shaft whereby a flow of lubricating fluid passes through the splines of said drive shaft.

3. A drive assembly as in claim 2 wherein said scavenging means comprises a series of passageways extending generally radially outward from the minor diameter of the internal splines to the exterior periphery of said drive shaft whereby the splines of said drive shaft and the outer splines of said adapter element are substantially immersed in lubricating fluid.

4. A drive assembly as in claim 1 further comprising:
   a housing surrounding said drive shaft means and having an annular opening substantially in line with the outer facing end of said drive shaft;
   means for sealing the outer periphery of said drive shaft relative to the opening in said housing thereby preventing leakage of lubricating fluid past the outer periphery of said drive shaft; and means for sealing the outer periphery of said adapter element relative to the bore of said drive shaft whereby the external splines on said adapter element and the internal splines on said drive shaft are immersed in lubricating fluid.

5. A drive assembly as in claim 4 further comprising:

a flange formed at the outer end of said adapter element for abutting the outer facing end of the said drive shaft; and a retaining flange releasably secured over the outer facing end of said drive shaft for restraining movement of said adapter away from the outer facing end of said drive shaft.

6. A drive assembly as in claim 5 wherein said adapter element is formed from a sleevelike element having a circular disk secured to the inner end of said element for preventing flow of oil to the internal splines of said adapter.

7. A drive assembly as in claim 6 wherein:

said drive shaft has a series of radially directed holes extending from the minor diameter of the internal splines of said drive shaft to the exterior periphery thereof;

said lubricating means comprises a jet adapted to discharge a supply of lubricating fluid against the exterior of said drive shaft at a position spaced from said splines, said drive shaft having a generally radial opening in line with said jet thereby permitting flow of lubricating fluid to the interior bore of said drive shaft.

8. A drive assembly comprising:

an outer elongated annular drive shaft having a first end adjacent said adapter element and having a plurality of internal splines formed at a second end axially spaced from said first end;

an elongated tubular element received in the interior of said outer drive shaft and having exterior splines at one end interfitting with the interior splines on said outer shaft and inwardly directed splines at the opposite end thereof;

an annular adapter element received in said tubular element at the opposite end thereof and having external splines interfitting with the internal splines formed in said drive shaft bore;

said adapter element also having a bore with internal splines formed therein to interfit with external splines of a driven shaft receivable in said adapter bore; and means for maintaining the coefficient of friction between the drive shaft splines and the adapter element external splines substantially lower than the coefficient of friction between the adapter element internal splines and the splines of said driven shaft whereby the adapter element rocks preferentially relative to the drive shaft to compensate for misalignment between the drive shaft means and said driven shaft;

whereby parallel and angular misalignment are compensated for.

9. A drive assembly as in claim 8 wherein said coefficient of friction maintaining means comprises means for lubricating the splines on said tubular element whereby said tubular element rocks preferentially relative to said adapter element and said outer drive shaft.

10. A drive assembly as in claim 9 further comprising means for scavenging oil from the splines on said outer drive shaft thereby maintaining a flow of lubricating fluid through said splines.

11. A drive assembly as in claim 10 wherein said scavenging means comprises a plurality of radially directed passageways extending from the minor diameter of the internal splines on said outer drive shaft to the outer periphery thereof.

12. A drive assembly as in claim 11 further comprising:

a housing surrounding said drive shaft and having an opening in alignment with said first end of said outer drive shaft;

means for sealing the periphery of the first end of said outer drive shaft relative to said housing;

means for sealing the tubular element relative to the outer drive shaft at a point between the internal splines of said outer drive shaft and the first end thereof;

means for sealing said annular adapter element relative to said tubular element at a point between the internal splines of said tubular element and the end of said tubular element adjacent the first end of said outer drive shaft.

13. A drive assembly as in claim 12 further comprising means on both ends of said outer drive shaft assembly for restraining axial movement of said tubular element and said adapter element.

* * * * *